United States Patent
Preiss

(10) Patent No.: US 7,139,245 B2
(45) Date of Patent: Nov. 21, 2006

(54) PRIORITY HANDLING OF VOICE OVER DATA IN A VOICE-OVER-INTERNET PROTOCOL PROCESSOR

(75) Inventor: Frank Preiss, Geltendorf (DE)

(73) Assignee: Infineon Technologies North America Corp., San Jose, CA (US)

( * ) Notice: Subject to any disclaimer, the term of this patent is extended or adjusted under 35 U.S.C. 154(b) by 898 days.

(21) Appl. No.: 09/991,206

(22) Filed: Nov. 16, 2001

(65) Prior Publication Data
US 2002/0075852 A1 Jun. 20, 2002

Related U.S. Application Data

(60) Provisional application No. 60/249,790, filed on Nov. 17, 2000.

(51) Int. Cl.
*H04J 1/16* (2006.01)
*H04J 3/14* (2006.01)
(52) U.S. Cl. ............ 370/252; 370/352; 370/389; 370/400; 370/474; 709/247
(58) Field of Classification Search .......... 370/260, 370/473–474, 252–253, 392, 352, 389, 400; 709/247
See application file for complete search history.

(56) References Cited

U.S. PATENT DOCUMENTS 5,975,531 A * 11/1999 Rebec et al. ............... 375/240
6,130,891 A * 10/2000 Lam et al. .................. 370/401
6,584,098 B1 * 6/2003 Dutnall ....................... 370/354
6,765,909 B1 * 7/2004 Sen et al. .................... 370/392
6,771,644 B1 * 8/2004 Brassil et al. ............... 370/390
6,772,319 B1 * 8/2004 Ganapathy et al. ......... 712/221
6,850,490 B1 * 2/2005 Woo et al. ................... 370/230
6,940,821 B1 * 9/2005 Wei et al. .................... 370/244
2002/0123899 A1 * 9/2002 Hall et al. ........................ 705/1
2004/0252701 A1 * 12/2004 Anandakumar et al. .............. 370/395.21
2005/0031097 A1 * 2/2005 Rabenko et al. .......... 379/93.31

* cited by examiner

*Primary Examiner*—John Pezzlo
*Assistant Examiner*—Inder Pal Mehra
(74) *Attorney, Agent, or Firm*—Fish & Richardson P.C.

(57) ABSTRACT

An apparatus for processing packets in a multimedia terminal has a media access controller to send and receive packets from a network. A digital signal processor converts a series of incoming real-time transfer protocol packets into an incoming digital signal and converts an outgoing digital signal into a series of outgoing real-time transfer protocol packets. A compression-decompression unit decompresses the incoming digital signal and generates an output signal to an output device and compresses an input signal from an input device and generates an outgoing digital signal. A central processing unit sends and receives transmission control protocol packets. The apparatus can store a packet in one of a plurality of queues in a buffer and assign a priority to the packet based on whether the packet is a real-time transfer protocol packet or a transfer control protocol packet.

14 Claims, 2 Drawing Sheets

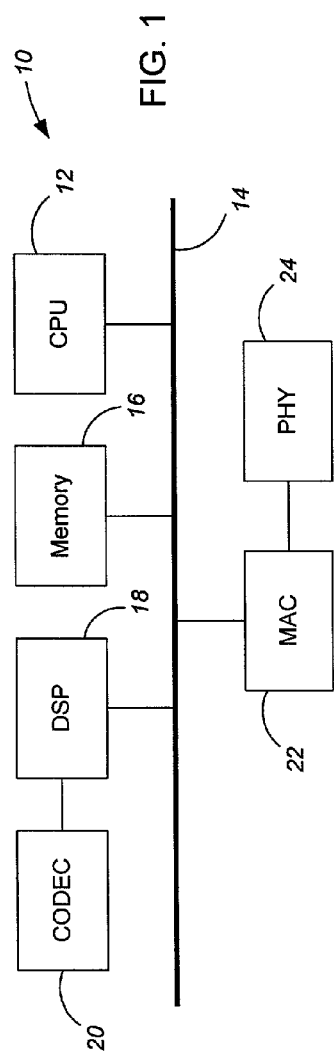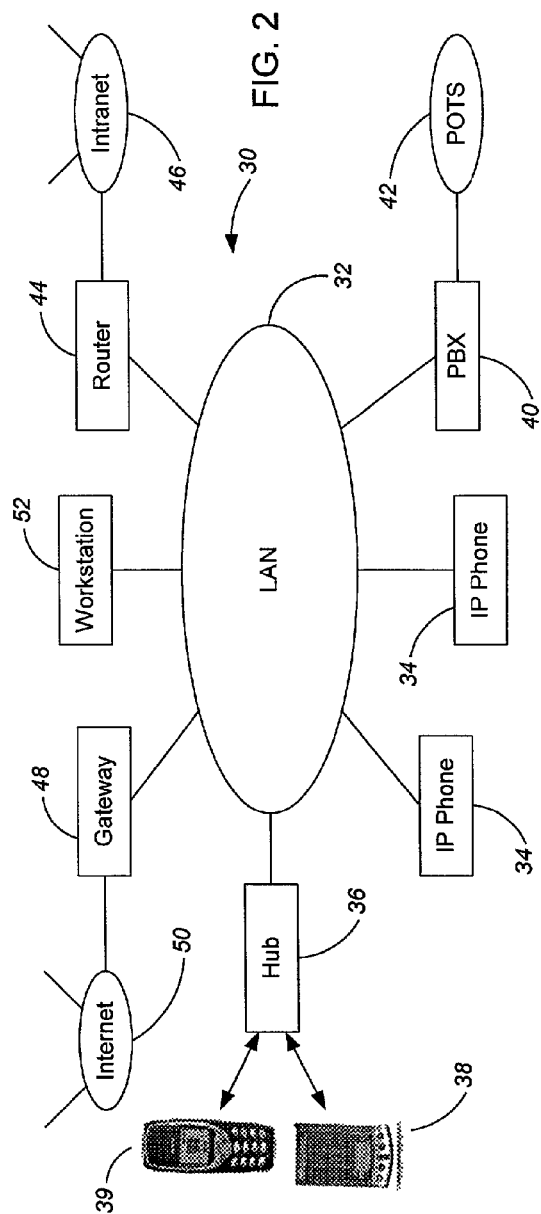

PRIORITY HANDLING OF VOICE OVER DATA IN A VOICE-OVER-INTERNET PROTOCOL PROCESSOR

RELATED APPLICATIONS

This application claims priority under 35 USC §119(e) to U.S. Patent Application Ser. No. 60/249,790, filed on Nov. 17, 2000, the entire contents of which are hereby incorporated by reference.

BACKGROUND

The present invention relates generally to communication systems, and more particularly to communication systems that handle both voice data and conventional computer data, such as Voice-over-Internet Protocol (IP) communication systems.

As computer networks become more powerful, the boundary between traditional telephony and data communication becomes increasingly blurred. Data can be sent through a computer network, such as a local area network (LAN), as a series of individually addressed packets. Such packets are conventionally used to carry computer data. However, it is also possible to transmit real-time voice data over a packetized network.

One advantage of using a computer network to carry both computer and voice data is that only a single set of wiring is needed. This is particularly advantageous for large businesses where the cost of installing wiring for both computer and telecommunication networks is considerable.

Currently, it is possible to provide real-time voice communication using an Internet protocol (IP) network. An acceptable quality of service can be achieved if the proper compression techniques are used and the network is fast enough to avoid noticeable delays.

However, future applications will dramatically increase the use of local area networks (LANs) for data transfer, including both traditional legacy data transfer and distributed application data transfer between terminals, workstations and servers. In particular, if terminals are upgraded for multimedia capability, such as a single simultaneous session including voice, video and data, there will be significant demands on the processing capabilities of the LAN. Moreover, as voice and data converge in a single application, new features will be expected for all elements in the packet network.

SUMMARY

In one aspect, the invention is directed to an apparatus for processing incoming packets in a multimedia terminal. The apparatus has a media access controller to receive packets from a network, a digital signal processor to convert a series of real-time transfer protocol packets into a digital signal, a decompression unit to decompress the digital signal and generate an output signal to an output device; a central processing unit to receive transmission control protocol packets, and a protocol parser unit to direct the real-time transfer protocol packets from the media access controller to the digital signal processor, and to direct transmission control protocol packets from the media access controller to the central processing unit.

In another aspect, the invention is directed to an apparatus for processing outgoing packets in a multimedia terminal. The apparatus has a compression unit to compress an input signal from an input device and generate a digital signal, a digital signal processor to convert the digital signal into a series of real-time transfer protocol packets, a media access controller to transmit packets to a network, a central processing unit to send transmission control protocol packets, and a protocol parser unit to direct the real-time transfer protocol packets from the digital signal processor and the central processing unit to the media access controller.

In another aspect, the invention is directed to an apparatus for processing incoming packets in a voice-over-Internet protocol device. The apparatus has a media access controller to receive packets from a network, a voice processing unit to convert a series of packets containing voice data into a digital signal, a decompression unit to decompress the digital signal and generate an output signal for an output device, a central processing unit to receive packets containing other data, and a protocol parser unit to determine whether packets received from the network contain voice data, to direct packets containing voice data to the voice processing unit and to direct packets containing other data to the central processing unit.

In another aspect, the invention is directed to an apparatus for processing incoming packets in a voice-over-Internet protocol device. The apparatus has a compression unit to compress an voice signal from an input unit and generate a digital signal, a voice processing unit to convert the digital signal into a series of packets containing voice data, a media access controller to transmit packets to a network, a central processing unit that generates packets containing other data, and a protocol parser unit to determine whether packets contain voice data and to direct packets from the voice processing unit and the central processing unit to the media access controller.

In another aspect, the invention is directed to an apparatus for processing packets in a multimedia terminal. The apparatus has a media access controller to send and receive packets from a network, a digital signal processor to convert a series of incoming real-time transfer protocol packets into an incoming digital signal and convert an outgoing digital signal into a series of outgoing real-time transfer protocol packets, a compression-decompression unit to decompress the incoming digital signal and generate an output signal to an output device and to compress an input signal from an input device and generate an outgoing digital signal, a central processing unit to send and receive transmission control protocol packets, and a protocol parser unit to direct the real-time transfer protocol packets to and from the media access controller to the digital signal processor, and to direct transmission control protocol packets to and from the media access controller to the central processing unit.

Implementations of the invention may include one or more of the following features. A buffer may have a plurality of queues, and the protocol parser unit may directs packets to one of the queues and schedules packets for processing. The protocol parser unit may schedule real-time transfer protocol packets for processing before transmission control protocol packets. The protocol parser unit may schedule packets containing voice data for processing before packets containing other data. The plurality of queues may have different priorities for processing, and the protocol parser unit may assign the packets to one of the queues based on the priority of the packet. The protocol parser unit includes a real-time protocol unit to segment and assemble real-time protocol packets a transfer control protocol unit to segment and assemble transfer control protocol packets. The real-time transfer protocol packets contain voice data.

In another aspect, the invention is directed to an apparatus for processing packets in a multimedia terminal. The apparatus has a media access controller to send and receive packets from a network, a digital signal processor to convert a series of incoming real-time transfer protocol packets into an incoming digital signal and convert an outgoing digital signal into a series of outgoing real-time transfer protocol packets, a compression-decompression unit to decompress the incoming digital signal and generate an output signal to an output device and to compress an input signal from an input device and generate an outgoing digital signal, a central processing unit to send and receive transmission control protocol packets, and a buffer unit having a plurality of queues. Incoming packets and outgoing packets are held by the buffer unit before processing.

In another aspect, the invention is directed to a method of processing incoming packets in a multimedia terminal. A packet is received in a media access controller from a network. Whether the packet is a real-time transfer protocol packet or a transfer control protocol packet is determined, and the packet is stored in one of a plurality of queues in a buffer and assigning a priority based on whether the packet is a real-time transfer protocol packet or a transfer control protocol packet. Packets from the buffer are processed in order of priority. A series of real-time transfer protocol packets are converted into a digital signal, and the digital signal is decompressed and directed to an output device. Transfer control protocol packets are directed to a central processing unit.

In another aspect, the invention is directed to a method of processing outgoing packets in a multimedia terminal. An input signal from an input device is compressed to generate a digital signal, and the digital signal is converted to a series of real-time transfer protocol packets. Transfer control protocol packets are generated in a central processing unit. The real-time transfer protocol packets and transfer control protocol packets are directed to a buffer, stored in one of a plurality of queues in the buffer, and assigning a priority based on whether the packet is a real-time transfer protocol packet or a transfer control protocol packet. The packets are processed from the buffer in order of priority, and processed packets are transmitted from a media access controller to a network.

Potential advantages of implementation of the invention may include the following. Processing delay for packets containing voice data can be reduced. A voice-over-Internet protocol system can provide quality of service comparable to traditional private branch exchange (PBX) or public switched telephone network (PSTN) systems.

The details of one or more implementations of the invention are set forth in the accompanying drawings and the description below. Other features, objects, and advantages of the invention will be apparent from the description and drawings, and from the claims.

BRIEF DESCRIPTION OF THE DRAWINGS

FIG. 1 illustrates a conventional multi-media IP terminal.

FIG. 2 illustrates the computing environment of a multimedia IP terminal.

DETAILED DESCRIPTION

Figure 3:
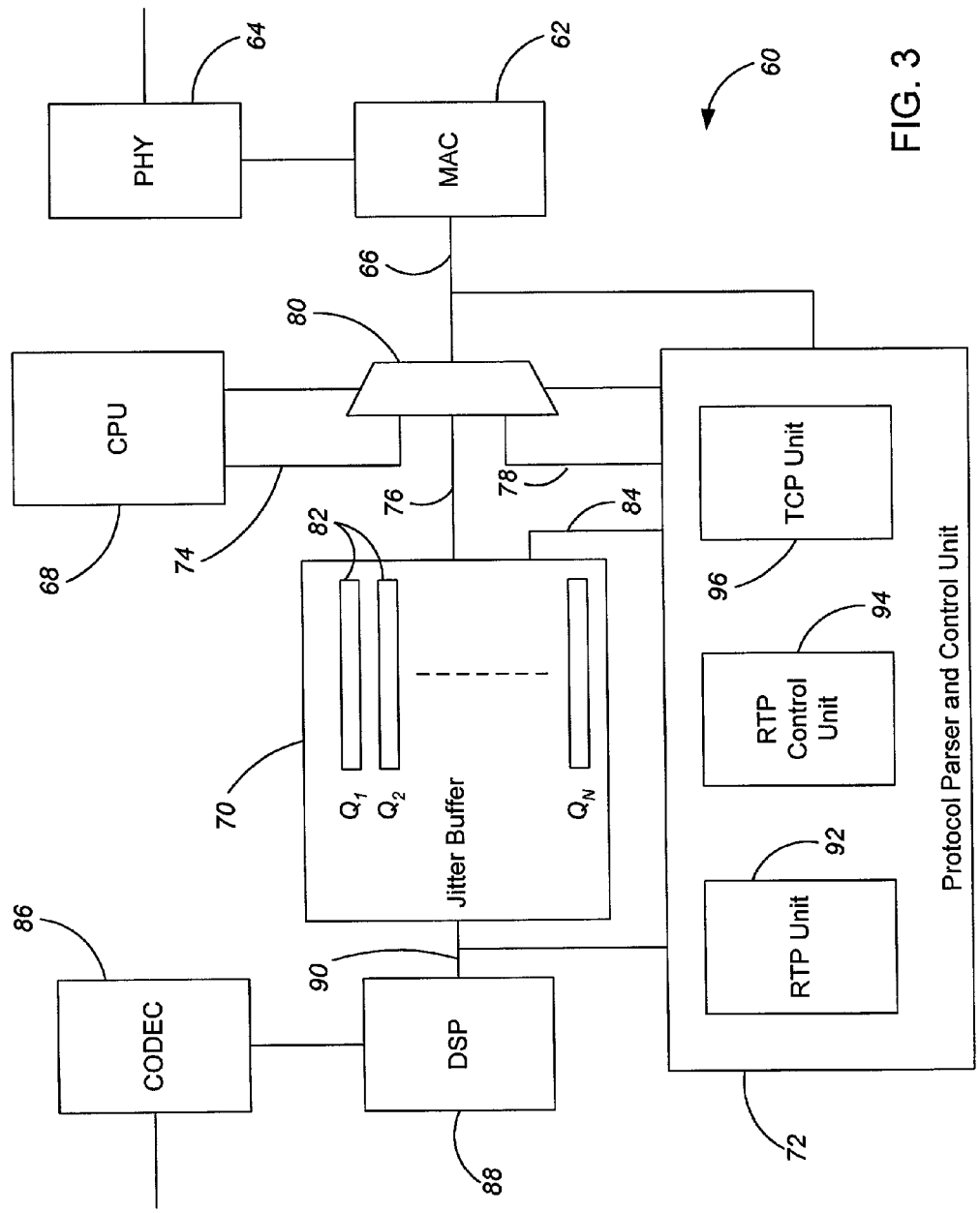
FIG. 3 illustrates the architecture of a terminal used for real-time packet processing.

Referring to FIG. 1, a typical multi-media terminal 10 includes a central processing unit (CPU) 12 that is coupled by a bus 14 to a memory 16 and a voice processing unit 18, such as a digital signal processor (DSP). The voice processing unit 18 assembles a series of packets into a digital voice signal, or vice-versa. The digital signal processor is coupled to a compression-decompression (CODEC) unit 20. The CODEC compresses and decompresses the digital data stream from or to an unillustrated voice input and output unit, such a microphone, speaker or handset. The bus 14 is also coupled to a media access controller (MAC) 22, such as an IEEE 802.3 MAC, to transmit and receive packets over a network. The MAC 22 is connected to the local area network (LAN) by a physical layer 24.

In operation, the centralized CPU 12 first handles all inbound packets on a Transmission Control Protocol/Internet Protocol/User Datagram Protocol (TCP/IP/UDP) level. After this stage, any Real-Time Transport Protocol (RTP) packets are identified by the CPU 12. The CPU 12 preprocesses the RTP packets and schedules any RTP packets containing voice data for processing by the voice processing unit 18. Finally, the RTP packets are forwarded to the voice processing unit 18, which unpacks the packet payload, i.e., voice samples, from the RTP packet to form the digital voice signal.

Similarly, for outbound packets, the voice processing unit 18 receives the digital voice signal and map the payloads to the proper packets, and the centralized CPU 12 handles all outbound packets on the TCP/IP/UDP level.

Any packets containing standard data are handled solely by the CPU 12. In addition, the CPU usually hosts any application software running on the terminal 10.

The quality of service for voice communication is typically determined by both the speech quality and the end-to-end delay of voice samples traveling from the source terminal or phone to the destination terminal or phone. Speech quality is impacted by dropped packets and the fidelity of the encoding/decoding scheme (e.g., the G.711 standard versus the G.729 standard), whereas end-to-end delay is impacted by time needed by the packets to cross through networks, gateways and routers.

One problem with this implementation is that each packet is scheduled sequentially for processing in the order of arrival at the CPU 12. Thus, the quality of service will depend heavily on the traffic conditions within the LAN segment. For example, heavy traffic, such as congestion, retransmission and large file transfers, can cause packets to be delayed, lost or dropped, and will significantly degrade the quality of service of the voice-over-Internet protocol application. In some cases, the quality of service will be lower than pulse code modulation (PCM) systems used in a traditional private branch exchange (PBX) or public switched telephone network (PSTN).

In particular, the transfer of large files can significantly impact the quality of service of the voice-over-Internet protocol network. For example, a 100 Mbyte file transmitted at 100 Mbits/second will require eight seconds of transfer time (plus time for transmission of the header and trailer. In contrast, a typical PSTN voice system allows only 200 milliseconds of delay per PCM sample before significant quality degradation sets in. In fact, in some cases the voice packets will not even be able to enter the network until the transmission of the file is complete and a protocol timeout occurs, resulting in a buffer overflow and loss of the voice packets.

Referring to FIG. 2, a combined data and voice-over-Internet protocol system 30 includes a local area network (LAN) 32 connected to one or more multi-media IP terminals, such as voice-over-Internet protocol telephones 34. In addition, the system 30 can include one or more hubs 36, e.g., a Bluetooth™ hub or a wireless LAN 802.11 hub, that connect the LAN 32 to a wireless handheld multimedia device, such as a cellular phone 38 or personal digital assistant 39. The LAN 32 can be a conventional Ethernet according to the IEEE 802.3 CSMA/CD standard.

The system 30 can also include a private branch exchange system 40 to connect the LAN 32 to the conventional public switched telephone network 42, a router 44 to connect the LAN 32 to an intranet system 46, and/or a gateway 48 to connect the LAN 32 to the Internet 50. In addition, the system 30 can include one or more conventional workstations 52.

FIG. 3 illustrates the basic architecture of a real-time packet processing system 60 included in each multi-media IP terminal, e.g., each voice-over-Internet protocol telephone 34 or voice-over-Internet hub 36. The packet processing system 60 includes a media access controller (MAC) 62, such as an IEEE 802.3 MAC, to transmit and receive packets over the LAN 32. The media access controller 62 is connected to the LAN by a physical layer 64, and is connected to the other components in the packet processing system by an input/output bus 66. The MAC unit 62 can segment and reassemble packets send and received to and from the LAN 32 via the physical layer 64.

The packet processing system 60 includes a compression-decompression (CODEC) unit 86 that compresses and decompresses a digital data stream from or to a voice input and output unit, such a microphone, speaker handset, or wireless system to provide voice input/output capability. The CODEC unit 86 is coupled to voice processing unit 88, such as a digital signal processor. The voice processing unit 88 can assemble a series of packets from an input/output bus 90 into a digital voice signal, or vice-versa.

The packet processing system 60 also includes a central processing unit (CPU) 68, a jitter buffer 70, and a protocol parser and control unit 72. The CPU has an input/output bus 74, the jitter buffer 70 has an input/output bus 76, and the protocol parser and control unit 72 has an input/output bus 78. The busses 74, 76 and 78 can be selectively coupled to the input/output bus 66 of the media access controller by a multiplexer (MUX) 80. The MUX 80 can be controlled by the central processing unit 68 or by the parser control unit 72.

The central processing unit 68 handles conventional tasks, such as processing data packets for applications, management and control messages. In addition, the CPU 68 usually hosts any application software running on the packet processing system 60.

The jitter buffer 70 handles jitter and delay from bursty traffic received from the LAN 32, and handles temporary storage of outbound packets from the voice processing unit 88. The jitter buffer 70 includes multiple data queues 82 labelled $Q_1 \ldots Q_N$. Each queue 82 supports bidirectional traffic, i.e., both inbound and outbound packets. A control line 84 from the protocol control unit 72 can set which data queue 82 receives the incoming packets on the bus 76 or outgoing packets on the bus 90. The control line 84 can also set which data queues 82 are used for incoming packets and which data queues are used for outgoing packets. In general, the highest priority queue is reserved for RTP packets, and more specifically for packets containing voice data. The queues can be handled in order of priority, so that all packets in the highest priority queue are processed before the packets in the next highest priority queue.

The protocol parsing and control unit 72 includes three subunits: a real-time protocol unit 92 to segment and reassemble Real-Time Transfer Protocol (RTP) packets, a real-time control protocol unit 94 to manage the parameters of the RTP setup, and a Transmission Control Protocol (TCP) preprocessing unit 96 to segment and reassemble TCP/IP packets. The control unit 72 can be connected directly to the input/output bus 66 of the media access controller 62 and to the input/output bus 90 of the voice processing unit 88.

In operation, each inbound packet from the MAC 62 is analyzed by the parcer control unit 72 to determine the priority and destination port of the packet. The parcer control unit 72 determines whether the packet contains voice data or other high-priority real-time data (such a streaming video data during a video teleconference). Based on the relative priority of the packet, the packet is directed to one of the data queues 82 in the jitter buffer 70. The parcer control unit 72 can determine which queue receives the packet based on the priority of the packet. In general, the packets are then processed in priority order, with each packet in the highest priority queue being processed before the packets in the next-highest priority queue. For example, packets containing voice data can be placed into a high-priority queue for priority processing by the voice processing unit 88. Once the packets have been scheduled for processing, normal data packets are reassembled by the TCP preprocessing unit 96 and directed to the CPU 68, whereas RTP packets (e.g., other than packets containing voice data which are processed by the voice processing unit 88) are reassembled by the real-time protocol unit 92.

Each outbound packet is also analyzed by the parcer control unit 72 to determine its priority for processing by the MAC 62. For example, outgoing packets containing voice data that have already been processed by the voice processing unit 88 can be placed into the highest priority queue and then moved directly to the MAC 62. In general, the packets are processed in priority order, with each packet in the highest priority queue being processed before the packets in the next-highest priority queue.

The multiple queues in the jitter buffer 70 permit the protocol parser 72 to interleave and/or interrupt an active file transfer with incoming or outgoing voice data. That is, by placing the packets for the active file transfer into a lower priority queue, and placing the packets for the voice-over-Internet Protocol in a higher priority queue, the voice packets will be handled first. This reduces the delay in transmitting and receiving voice packets while avoiding dropped packets, thereby improving the quality of service. Moreover, both incoming and outgoing voice packets can be given priority over incoming and outgoing file transfer or other real-time data transfers.

In addition, since a single jitter buffer 70 is used for both incoming and outgoing packets, the buffer management is centralized to reduce on-chip data transfer. The system can demultiplex voice, video and data traffic at a relatively early point, permitting specialized processing. The architecture can provide relatively high performance while maintaining flexibility. In addition, the packet processing system 60 can be fabricated as a single-chip design.

An implementation of the invention has been described. Nevertheless, it will be understood that various modifications may be made without departing from the spirit and scope of the invention.

What is claimed is:

1. An apparatus for processing incoming packets in a multimedia terminal, comprising:
   a media access controller configured to receive packets from a network;
   a digital signal processor configured to convert a series of real-time transfer protocol packets into a digital signal;

a decompression unit configured to decompress the digital signal and generate an output signal to an output device;

a central processing unit configured to receive transmission control protocol packets; and a protocol parser unit configured to determine whether an incoming packet is a real-time transfer protocol packet or a transmission control protocol packet, to direct the received real-time transfer protocol packets from the media access controller to the digital signal processor, and to direct the received transmission control protocol packets from the media access controller to the central processing unit.

2. An apparatus for processing incoming packets in a voice-over-Internet protocol device, comprising:

a media access controller configured to receive packets from a network;

a voice processing unit to convert a series of packets containing voice data into a digital signal;

a decompression unit to decompress the digital signal and generate an output signal for an output device;

a central processing unit to receive packets containing other data; and a protocol parser unit to determine whether packets received from the network contain voice data, to direct packets containing voice data to the voice processing unit and to direct packets containing other data to the central processing unit.

3. An apparatus for processing packets in a multimedia terminal, comprising:

a media access controller configured to send and receive packets from a network;

a digital signal processor configured to convert a series of incoming real-time transfer protocol packets into an incoming digital signal and convert an outgoing digital signal into a series of outgoing real-time transfer protocol packets;

a compression-decompression unit configured to decompress the incoming digital signal and generate an output signal to an output device and to compress an input signal from an input device and generate an outgoing digital signal;

a central processing unit configured to send and receive transmission control protocol packets;

a protocol parser unit configured to determine whether a packet is a real-time transfer protocol packet or a transmission control protocol packet, to direct the received real-time transfer protocol packets to and from the media access controller to the digital signal processor, to direct the received transmission control protocol packets from the media access controller to the central processing unit, to direct the outgoing real-time transfer protocol packets from the digital signal processor to the media access controller, and to direct the outgoing transmission control protocol packets from the central processing unit to the media access controller; and a buffer having a plurality of queues, wherein the protocol parser unit is configured to direct packets to one of the queues and to schedule packets for processing based on whether the packet is a real-time transfer protocol packet or a transmission control protocol packet.

4. The apparatus of claim 3, wherein the protocol parser unit is configured to schedule real-time transfer protocol packets for processing before transmission control protocol packets.

5. The apparatus of claim 3, wherein the protocol parser unit is configured to schedule packets containing voice data for processing before packets containing other data.

6. The apparatus of claim 3, wherein the plurality of queues have different priority for processing, and the protocol parser unit is configured to assign the packets to one of the queues based on a priority of a packet.

7. The apparatus of claim 3, wherein the protocol parser unit includes a real-time protocol unit configured to segment and assemble real-time protocol packets.

8. The apparatus of claim 3, wherein the protocol parser unit includes a transmission control protocol unit configured to segment and assemble transmission control protocol packets.

9. The apparatus of claim 3, wherein the real-time transfer protocol packets contain voice data.

10. The apparatus of claim 3, wherein the buffer is configured to hold incoming packets and outgoing packets before processing.

11. The apparatus of claim 3, wherein the real-time transfer protocol packets contain voice data.

12. An apparatus for processing outgoing packets in a multimedia terminal, comprising:

a compression unit configured to compress an input signal from an input device and generate a digital signal;

a digital signal processor configured to convert the digital signal into a series of real-time transfer protocol packets;

a media access controller configured to transmit packets to a network;

a central processing unit configured to send transmission control protocol packets;

a protocol parser unit configured to determine whether a packet is a real-time transfer protocol packet or a transmission control protocol packet and to direct the real-time transfer protocol packets from the digital signal processor and the central processing unit to the media access controller; and a buffer having a plurality of queues, wherein the protocol passer unit is configured to direct packets to one of the queues and to schedule packets for processing based on whether the packet is a real-time transfer protocol packet or a transmission control protocol packet.

13. A method of processing incoming packets in a multimedia terminal, comprising:

receiving a packet in a media access controller from a network;

determining whether the packet is a real-time transfer protocol packet or a transmission control protocol packet;

storing the packet in one of a plurality of queues in a buffer and assigning a priority to the packet based on whether the packet is a real-time transfer protocol packet or a transmission control protocol packet;

processing packets from the buffer in order of priority;

converting a series of real-time transfer protocol packets into a digital signal;

decompressing the digital signal and directing the decompressed signal to an output device; and directing transmission control protocol packets to a central processing unit.

14. A method of processing outgoing packets in a multimedia terminal, comprising:

compressing an input signal from an input device to generate a digital signal;

converting the digital signal into a series of real-time transfer protocol packets;

generating transmission control protocol packets in a central processing unit;

directing the real-time transfer protocol packets and transmission control protocol packets to a buffer;

determining whether a packet is a real-time transfer protocol packet or a transmission control protocol packet;

storing the packet in one of a plurality of queues in the buffer and assigning a priority to the packet based on whether the packet is a real-time transfer protocol packet or a transmission control protocol packet;

processing packets from the buffer in order of priority; and transmitting processed packets from a media access controller to a network.

* * * * *